US 9,249,815 B2

(12) United States Patent
Baraud et al.

(10) Patent No.: US 9,249,815 B2
(45) Date of Patent: Feb. 2, 2016

(54) DEVICE FOR FIXING INSULATING LAYERS AND INSULATION ASSEMBLY SYSTEM

(71) Applicant: ROCKWOOL INTERNATIONAL A/S, Hedehusene (DK)

(72) Inventors: Ismael Baraud, Saint-Denis (FR); Angelique Guillem, Issy-les-Moulineaux (FR)

(73) Assignee: ROCKWOOL INTERNATIONAL A/S, Hedehusene (DK)

( * ) Notice: Subject to any disclaimer, the term of this patent is extended or adjusted under 35 U.S.C. 154(b) by 0 days.

(21) Appl. No.: 14/353,077

(22) PCT Filed: Oct. 12, 2012

(86) PCT No.: PCT/EP2012/004284
§ 371 (c)(1),
(2) Date: Apr. 21, 2014

(87) PCT Pub. No.: WO2013/056802
PCT Pub. Date: Apr. 25, 2013

(65) Prior Publication Data
US 2014/0245688 A1    Sep. 4, 2014

(30) Foreign Application Priority Data

Oct. 21, 2011  (EP) .................................. 11290492

(51) Int. Cl.
*E04B 2/00*  (2006.01)
*E04B 5/00*  (2006.01)
(Continued)

(52) U.S. Cl.
CPC ... *F16B 5/02* (2013.01); *E04B 1/76* (2013.01); *E04B 1/7612* (2013.01);
(Continued)

(58) Field of Classification Search
CPC .......... F16B 13/00; F16B 33/02; F16B 39/06; F16B 25/0052; F16B 25/0057; E04B 2002/0289

USPC ........... 52/506.05, 741.15, 512, 506.01, 410, 52/408, 745.21; 411/394, 409, 414, 426, 411/307, 387.5, 418, 387.3, 403
See application file for complete search history.

(56) References Cited

U.S. PATENT DOCUMENTS 3,177,755 A * 4/1965 Kahn .............................. 411/386
3,331,274 A * 7/1967 Walton .......................... 411/403
(Continued)

FOREIGN PATENT DOCUMENTS

DE    199 31 794    2/2001
EP    0 425 358    5/1991
(Continued)

OTHER PUBLICATIONS

International Search Report dated Oct. 29, 2012, corresponding to PCT/EP2012/004284.

*Primary Examiner* — Chi Q Nguyen
(74) *Attorney, Agent, or Firm* — Young & Thompson (57) ABSTRACT

A screw device for fixing insulating panels together is made in one piece from synthetic material and includes a head and a shank. The head has a flat surface for abutment on one of the insulating panels, a surface opposite the abutment surface having at least one drive wing, which extends to a distance greater than 10 mm from the opposite surface. The shank includes an elongate body extending from the head and substantially perpendicular to the abutment surface. The screw has a point arranged at an end of the body opposite the head, and at least one helical thread, which extends at least over part of at least one of the point and body, and is spaced from the head. The helical thread has a diameter that increases towards the head, a portion having a frustum-shaped envelope, and a pitch greater than 8 mm.

20 Claims, 4 Drawing Sheets

(51) Int. Cl.
*E04B 9/00* (2006.01)
*F16B 5/02* (2006.01)
*F16B 25/00* (2006.01)
*F16B 33/00* (2006.01)
*E04B 1/76* (2006.01)
*E04B 2/28* (2006.01)
*F16B 33/02* (2006.01)
*F16B 13/00* (2006.01)
*F16B 39/06* (2006.01)
*E04B 2/02* (2006.01)
*F16B 13/04* (2006.01)
*E04F 13/08* (2006.01)

(52) U.S. Cl.
CPC ............... *E04B 1/7629* (2013.01); *E04B 2/28* (2013.01); *F16B 25/0015* (2013.01); *F16B 25/0047* (2013.01); *F16B 33/006* (2013.01); *E04B 2002/0289* (2013.01); *E04F 13/0821* (2013.01); *F16B 13/00* (2013.01); *F16B 13/002* (2013.01); *F16B 13/045* (2013.01); *F16B 33/02* (2013.01); *F16B 39/06* (2013.01)

(56) References Cited

U.S. PATENT DOCUMENTS

| | | | | |
|---|---|---|---|---|
| 4,763,456 | A | * | 8/1988 | Giannuzzi ...................... 52/410 |
| 5,212,927 | A | * | 5/1993 | Sheahan ...................... 52/741.4 |
| 5,562,672 | A | * | 10/1996 | Huebner et al. .............. 606/317 |
| 5,657,602 | A | * | 8/1997 | Hellander ....................... 52/446 |
| 5,987,837 | A | * | 11/1999 | Nelson ....................... 52/506.05 |
| 6,021,617 | A | * | 2/2000 | Sheahan ......................... 52/410 |
| 6,079,921 | A | | 6/2000 | Gauthier et al. |
| 6,264,677 | B1 | * | 7/2001 | Simon et al. .................. 606/232 |
| 7,070,376 | B1 | * | 7/2006 | Toback ........................ 411/82.2 |
| 8,192,123 | B2 | * | 6/2012 | Ernst et al. ................. 411/387.1 |
| 2004/0055236 | A1 | * | 3/2004 | Keith ............................... 52/410 |
| 2012/0216658 | A1 | * | 8/2012 | Hawkes et al. ................. 81/451 |

FOREIGN PATENT DOCUMENTS

EP 0 943 822 9/1999
EP 2 339 188 6/2011

\* cited by examiner

DEVICE FOR FIXING INSULATING LAYERS AND INSULATION ASSEMBLY SYSTEM

BACKGROUND OF THE INVENTION

The invention relates to devices for fixing insulating panels, and more precisely fixing screws and assemblies of insulating panels.

DESCRIPTION OF THE RELATED ART

To improve the heat and/or sound insulation of buildings, it is customary to use layers of flexible or semi-rigid materials, for example insulating panels. It is desirable for these panels to have good fire resistance and this is one of the reasons why panels based on mineral fibres, particularly rock wool, are increasingly being used. These panels may be made in different densities and thicknesses as required.

The use of such insulating panels is widespread in new builds but also in the renovation and refurbishment of existing buildings. The desire for energy savings regularly drives those active in the field to increase heat capacity. The Applicant has conducted research into improving thickness, notably with systems for assembling new insulating panels to one another. The Applicant has also perfected a system of assembling new insulating layers on pre-existing insulating layers. The Applicant seeks to preserve old insulating layers that do not comply with current standards, to which new insulating layers are added. There was no satisfactory solution that was compatible with the majority of types of existing insulating layers, nor was there a multifunctional system capable of being used in the vast majority of configurations of insulating systems to be created or modified, notably in order to fix one panel on top of another.

The invention sets out to improve the situation.

SUMMARY OF THE INVENTION

The fixing screw device for joining insulating panels together is a unified structure made of synthetic material comprising a head and a shank. The head comprises a flat surface abutting on one of the insulating panels, a surface opposite the abutment surface being provided with at least one drive wing. The drive wing may be operated with at least two fingers, for example. The wing extends to a selected distance from the opposite surface, this distance being greater than 10 mm. The shank comprises an elongated body extending from the head and substantially perpendicular to the abutment surface, a point located at one end of the body opposite the head, and at least one helical thread. The helical thread extends at least over part of at least one of the point and body and is remote from the head. The helical thread has an increasing diameter towards the head, the helical thread comprising a portion having a frustum-shaped envelope and the pitch of the helical thread being greater than 8 mm.

A layer of air, such as e.g. forming a ventilation air gap is maintained between an outer surface of the insulating panels and an additional wall or cladding fixed opposite the outer surface. The wing on the screw head makes it possible to limit condensation phenomena and thus improve the long-term efficacy of the insulating panels.

The screw may comprise a hollow indentation for rotational driving. The hollow indentation makes it possible not only to limit the quantity of material of which the screw is made, making it lighter and less expensive, but also enables it to be tightened using a conventional tool in addition to tightening by hand. The product is easily removed from the mould during the manufacturing process.

The hollow indentation may extend axially to the vicinity of the thread. This allows the screwing torque to be applied as close as possible to the thread, so as to limit the stresses, particularly torsional, applied to the shank of the screw during screwing.

The body of the shank may be cylindrical or frustum-shaped. The body of the shank may comprise grooves. The grooves improve the mechanical characteristics while limiting the mass of the shank.

The body of the shank may have a ratio of length to diameter of more than 20. It is then possible to penetrate substantial thicknesses of insulating panels while requiring a screw torque that is compatible with hand tightening.

The pitch of the helical thread may be greater than 15 mm, preferably 25 mm. This allows a low number of turns for rapid screwing. Screwing is thus ergonomic and the effort involved in the assembly, notably the repetition of the movement carried out by the operator, is reasonable. The risk of fatigue and occupational injury is reduced.

The helical thread may comprise a portion having a cylindrical envelope. This makes it possible to elongate the developed length of the helical thread and hence its range, i.e. the total surface for engagement of the thread in the insulating panels without widening the hole formed in the insulating panels by the screw action.

The abutment surface of the head may be provided with bosses. This has the effect of preventing it coming loose by attaching the screw head to the outer surface of an insulating panel. The bosses may be asymmetrical with respect to a sectional plane passing through an axis of the shank so as to confer a frictional torque that is greater in the direction of unscrewing than in the direction of screwing. The slight friction at the end of screwing brings about an increase in the torque needed at the end of screwing. This is a guide to the operator and reduces the risk of over-tightening.

The screw may comprise two wings extending radially on either side of one axis of the shank and extending axially to a chosen distance from the opposite surface. The wings may be coplanar. The wings may be curved around axes parallel to the axis of the shank, making the screw more ergonomic.

For reasons of practicality, it is preferable to minimise the use of specific tools for the assembly, while limiting the time and number of operations involved in the assembly. The Applicant has found that there is no existing device or system in which the motive force of an operator's fingers, without the use of a tool, is sufficient for the assembly, on the one hand, and wherein the number of turns carried out during tightening is compatible with an industrially satisfactory assembly time.

The body may comprise a hollow portion. This reduces the quantity of material constituting the screw, limits its mass and hence the cost of manufacture and use.

Moreover, the assembly of the various layers has to limit the thermal bridges. There is not currently any fixing device in existence that is satisfactory in this respect. The known devices have a tendency to assist heat conduction, at least locally.

In another aspect, the invention relates to a system for insulating the walls of buildings, comprising at least one first insulating panel and at least one second insulating panel with a bulk density of between 10 and 300 kg/m3, mutually superimposed in the common direction of their thicknesses and joined together by at least one screw, the said screw being of unified construction in synthetic material and comprising a head and a shank, the head comprising a flat surface for abutting on one of said insulating panels, a surface opposite the abutment surface being provided with at least one wing to be driven by at least two fingers, said wing extending to a selected distance from the opposite surface, the said distance being greater than 10 mm, the shank comprising an elongated body extending from the head and substantially perpendicular to the abutment surface, a point located at one end of the body opposite the head, and at least one helical thread, the helical thread extending over at least part of at least one of the point and the body and being remote from the head, the helical thread increasing in diameter towards the head, the helical thread comprising a portion having a frustum-shaped envelope, the pitch of the helical thread being more than 8 mm, the screw being located substantially in the direction of thickness of the insulating panels, a portion of the shank passing through the thickness of the second panel, the thread being engaged at least partially in the first panel and the abutment surface being in contact with an outer surface of the second panel.

The assembly system, for reasons of cost and production time, is adapted to the devices, structures and methods already in existence on the market. In particular, the substantial cost of plant for manufacturing the elements involved in the insulating system, such as support structures, for example, makes modifications difficult. The Applicant proposes a device and a system the use of which will avoid the need for investment in other plants. To limit the costs and assist with the use of such devices in renovations, the supporting structures with their current dimensions are retained.

The Applicant proposes means and methods of assembly that can be used in new builds and renovations. Renovation may comprise, in particular, the provision of at least one new insulating layer in addition to at least one existing insulating layer. The different layers may have different characteristics particularly in terms of their dimensions, bulk density, density, sound proofing and fire resistance.

The system may further comprise an additional wall bearing on at least one wing of the screw, so that a layer of air, such like e.g. of a ventilation gap with a non-zero thickness is formed between the additional wall and the outer surface of the second panel. The layer of air may have a thickness of at least 10 mm. This makes it possible to reduce the phenomena of condensation and the passage of moisture between the insulating panels and an additional wall, for example a cladding.

The first insulating panel of the system may be mounted in a profile and held in the profile by a flange of the profile. The second insulating panel may be fixed to the first insulating panel by the screw positioned at a spacing from the profile. The phenomena of thermal bridging are reduced.

In another aspect, the invention relates to a kit for mounting a second insulating panel to a first insulating panel. The kit comprises at least one second insulating panel with a mean bulk density of between 10 and 300 kg/m3 each and a fixing screw. The said screw is made of synthetic material in one piece and comprises a head and a shank, the head comprising a flat surface for abutting on one of said insulating panels, a surface opposite the abutment surface provided with at least one wing, the said wing extending to a chosen distance from the opposite surface, the said distance being greater than 10 mm, the shank comprising an elongated body extending from the head and substantially perpendicular to the abutment surface, a point located at an end of the body opposite the head, and at least one helical thread, the helical thread extending over at least part of at least one of the point and the body and being remote from the head, the helical thread increasing in diameter towards the head, the helical thread comprising a portion having a frustum-shaped envelope, the pitch of the helical thread being more than 8 mm. The second insulating panel is intended to be fixed to a first insulating panel so that the first insulating panel and the second insulating panel are mutually superimposed in the common direction of their thicknesses and are joined together by the screw. The screw is intended to be screwed substantially in the direction of the thicknesses of the insulating panels, a portion of the shank passing through the thickness of the second insulating panel, so that the thread is trapped within the first insulating panel and so that the abutment surface is in contact with an outer surface of the second insulating panel. In one embodiment the at least one wing is to be driven by at least two fingers.

In another aspect the invention relates to a process for fixing a second insulating panel to a first insulating panel comprising screwing a fixing screw, manually or using a tool, through the thickness of a second insulating panel and engaging the helical thread of the screw in the first insulating panel.

The process may be designed so that the torque of the screw is between 0.2 and 2.0 Nm, preferably between 0.3 Nm and 1.8 Nm and, still more preferably, between 0.5 and 1.5 Nm or between 0.6 and 1.3 Nm in rock wool with a mean bulk density of 50 kg/m3. This allows manual screwing while reducing the risk of the screw accidentally working loose.

The process may be designed so that the torque of the screw is between 0.2 and 2.0 Nm, preferably between 0.3 Nm and 1.8 Nm and still more preferably between 0.5 and 1.5 Nm or between 0.6 and 1.3 Nm in polyurethane (PUR) or polyisocyanurate (PIR). This allows manual screwing while reducing the risk of the screw accidentally working loose.

The system may be arranged such that the first insulating panel is arranged at least partly in a profile and held therein by a flange of the profile, and the second insulating panel is arranged outside the profile, the screw being arranged at a spacing from the profile. This type of system reduces the phenomenon of thermal bridging by conduction between the fixing screws and the profile, which are often made of heat conducting materials. However, such system may also be used with a variety of applications within the building sector whenever layers of insulation have to be securely fastened to either pre-existing insulating layers or to a first insulation layer within a double/multi layer arrangement, e.g. within ventilated façade systems, cavity walls, etc.

The insulating panels preferably comprise one or more materials selected from among rock wool, glass wool or foams based on plastics, expanded polystyrene (EPS) or extruded polystyrene (XPS), polyurethane (PUR), polyisocyanurate (PIR) or expanded polypropylene (EPP).

BRIEF DESCRIPTION OF THE DRAWING FIGURES

Further features and advantages will become apparent from a study of the detailed description that follows, and the attached drawings, wherein.

DETAILED DESCRIPTION OF THE INVENTION

The attached drawings are largely definitive by nature and may not only serve to complete the invention but also help to define it, in certain circumstances.

Figure 1:
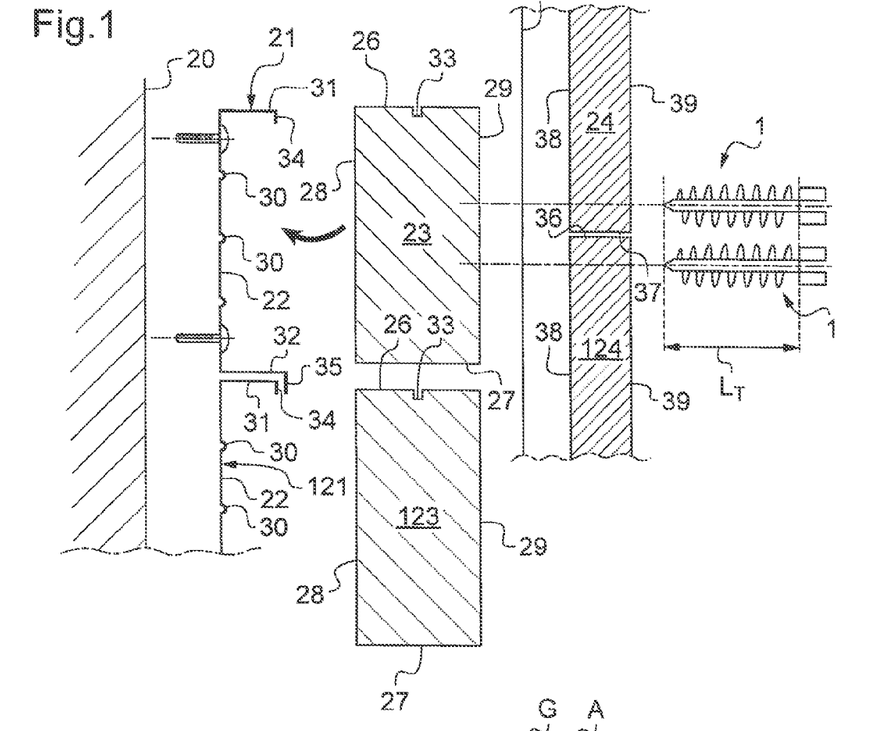
FIG. 1 is an exploded diagrammatic view of an assembly of insulating panels.

A system for assembling insulating panels 23, 123, 24, 124, by means of fixing screws 1 in a building, is shown during assembly in FIG. 1. A building comprises a fixed support 20, for example a concrete pillar or metal post. Metal profiles (or "profiled sections", or "sections", or "beams") 21, 121 are positioned against the fixed support 20 and fixed in known manner. The assembly system comprising the assembled profiles 21, 121 and the insulating panels 23, 123, 24, 124 also form a "weather-boarding". Although within the field of insulation the term weather-boarding may usually denote a vertical non-load-bearing external cladding, the word weatherboard here is to be taken in its more general sense, i.e. a non-load-bearing cladding, which may be internal, external or intermediate, vertical or otherwise, such as a facing, for example.

The profiles 21, 121 are similar. The profiles 21, 121, as their name indicates, are parts that have a profile (shown in cross-section in FIG. 1) that is substantially identical over their entire length, in the direction perpendicular to the plane in FIG. 1, notably obtained by bending/folding. The profiles 21, 121 could be obtained by profiling, extrusion, lamination and/or forming. This type of part is inexpensive to produce. By contrast, a modification located along its length, i.e. constituting an exception to its profiled nature, is theoretically possible but involves significant costs.

The profile 21, in the embodiment described here, comprises a core 22 provided with longitudinal reinforcing ribs 30 that strengthen the core 22. With the exception of the ribs 30, the core 22 is substantially flat. The ribs 30 help prevent the core 22 from buckling. The profile 21 here is mounted substantially perpendicularly to the fixed support 20, i.e. in a substantially horizontal direction. The profile 21 also comprises an upper wing 31 and a lower wing 32. The upper wing 31 and the lower wing 32 are arranged at the top and bottom, respectively, of the core 22. The upper and lower wings 31 and 32 are arranged in planes substantially perpendicular to that of the core 22 and extend on the same side of the core 22, in this case the side opposite that of the fixed support 20. In other words, the upper and lower wings 31 and 32 form the arms of a C, the core 22 of which is the body, in section in the plane of FIG. 1. The distance between the upper wing 31 and the lower wing 32 defines a recess height of the profile 21. The upper and lower wings 31 and 32 extend in parallel directions, from left to right in FIG. 1, over similar widths. The widths of the upper and lower wings 31 and 32 define the thickness of the profile 21, for example 10 cm. This thickness is to be distinguished from the thickness of the sheet metal forming the profile 21, which is typically a few millimeters.

The upper and lower wings 31 and 32 are each provided at their ends opposite the core 22 with an upper flange 34 and lower flange 35, respectively, oriented downwards in this instance. The upper flange 34 extends substantially vertically and towards the lower wing 32 from the end of the upper wing 31. The lower flange 35 extends substantially vertically and away from the upper wing 31 starting from the end of the lower wing 32. The profiles 21, 121 are mounted successively on top of one another. Each lower wing 32 of a profile 21 at least partly covers an upper wing 31 of another profile 121 arranged immediately underneath. The lower wing 32 and the lower flange 35 of the upper profile 21 substantially overlap the upper wing 31 and upper flange 34 of the lower profile 121. The dimensions of the wings and flanges are selected accordingly. The core 22, the upper and lower wings 31 and 32, the upper and lower flanges 34 and 35, respectively, and a plane that connects the two flanges define an open envelope of the profile 21.

The assembly, in the embodiment described here, comprises two similar first insulating panels 23 and 123, on the one hand, and two similar second insulating panels 24 and 124, on the other hand. The first insulating panels 23, 123 and the second insulating panels 24, 124 may comprise, for example, rock wool, glass wool, plastic-based foams, expanded polystyrene (EPS or XPS), polyurethane (PUR), polyisocyanurate (PIR), or expanded polypropylene (EPP).

The first insulating panels 23, 123 and the second insulating panels 24, 124 in this instance are generally rectangular cuboids in shape. Before assembly, the first insulating panels 23, 123 and/or the second insulating panels 24, 124 may be rolled up on themselves. The first insulating panels 23, 123 and the second insulating panels 24, 124 each comprise a length, a height and a width, in the decreasing order of their three dimensions. Here, the lengths are oriented horizontally and parallel to the length of the profiles 21, 121, in a direction perpendicular to the plane of FIG. 1. Here, the heights are oriented vertically and perpendicularly to the length of the profiles 21, 121 in a direction substantially parallel to the height of the profiles 21, 121. Here, the thicknesses are oriented horizontally and perpendicularly to the length of the profiles 21, 121, in a direction parallel to the thickness of the profiles 21, 121.

For each of the first insulating panels 23, 123, on the one hand, and the second insulating panels 24, 124, on the other hand, are designated:

an inner surface 28, 38 perpendicular to the direction of thickness of the cuboid and oriented in this case towards the core 22 of the profile 21, 121, an outer surface 29, 39 perpendicular to the direction of thickness of the cuboid and oriented in this case away from the core 22 of the profile 21, 121, an upper surface 26, 36, perpendicular to the direction of height of the cuboid and oriented upwards in this case, a lower surface 27, 37 perpendicular to the direction of height of the cuboid and oriented downwards in this case, two opposite sectional surfaces perpendicular to the direction of length of the cuboid and not visible in FIG. 1.

The first insulating panels 23, 123, in the embodiment described here, have heights selected to enable them to be inserted between the upper wing 31 and the lower wing 32 of the profile 21, 121.

The first insulating panels 23, 123 have a greater thickness than the profiles 21, 121. The thickness of the first insulating panels 23, 123 is, for example, double the thickness of the profiles 21, 121.

The first insulating panels 23, 123 are here each provided with an upper notch 33. The upper notch 33 is provided starting from the upper surface 26 of each of the first insulating panels 23, 123. The upper notch 33 is located substantially parallel to the length of the first insulating panel 23, 123. The upper notch 33 has a depth that is designed to accommodate the upper flange 34 of a first profile 121 and the lower flange 35 of another profile 21 arranged immediately above the first. The upper notch 33 has a width, oriented in the direction of thickness of the first insulating panel 23, 123, adapted to accommodate the upper flange 34 of a first section 121 and the lower flange 35 of another section 21 arranged immediately above the first. The upper notch 33 is arranged substantially halfway down the thickness of the first insulating panel 23, 123.

In the assembled state of the assembly, the first insulating panel 23 is arranged in the upper profile 21 between the upper wing 31 and the lower wing 32. The first insulating panel 23 may be mounted in the profile 21. As for the other insulating panel 123, similar to the first insulating panel 23, it is arranged similarly in the lower profile 121. The interaction between at least one of the flanges in the two superimposed profiles 21, 121 and the notch 33 in the first insulating panel 123 enables the first insulating panel 123 to be held in the lower profile 121.

The upper surface 26 of the first insulating panel 123 and the lower surface 27 of the first insulating panel 23 are mutually facing or in contact with one another. This pair of surfaces 26 and 27 of the two first insulating panels 23 and 123 may be in contact or just touching and form an abutment. This pair of surfaces 26 and 27 of two first insulating panels 23 and 123 may be spaced apart by an interstice or some play. The interface comprising the upper surface 26 of the first insulating panel 123, the lower surface 27 of the first insulating panel 23 and the spacing between these two surfaces (zero or greater than zero) is referred to here as the "connecting region". The superimposed second insulating panels 24, 124 have similar connecting regions.

The connecting region of two first insulating panels 23 and 123 superimposed vertically is substantially aligned horizontally with the wings 31 and 32 of the profiles 21, 121. There is a danger of a spacing remaining between two consecutive first insulating panels 23, 123. One solution is to provide an additional thickness or layer of insulation. The additional thickness of insulation is formed by the second insulating panels 24, 124 in the embodiment described here.

The connecting regions of the first insulating panels 23, 123, on the one hand, and the second insulating panels 24, 124, on the other hand, are offset. In other words, the upper and lower surfaces 26 and 27, respectively, of the first insulating panels 23, 123, on the one hand, and the upper and lower surfaces 36 and 37, respectively, of the second insulating panels 24, 124, on the other hand, are offset. The connecting region between two successive section insulating panels 24, 124, is located vertically spaced from the connecting regions of the first insulating panels 23, 123. The offset may be halfway up, for example.

In the direction of length of the first insulating panels 23, 123 and the second insulating panels 24, 124, the connecting regions of the sectional surfaces between two first insulating panels 23, 123 side by side on the one hand and the connecting regions of the sectional surfaces between two second insulating panels 24, 124 side by side may be offset, for example, halfway along.

To assist with the offsetting, the first insulating panels 23, 123 and the second insulating panels 24, 124 are substantially identical in length and substantially identical in height.

The connecting region between two successive second insulating panels 24, 124 is located, in the direction of thickness, at a spacing from the upper and lower flanges 34 and 35, respectively. This helps to prevent thermal bridges.

The first insulating panels 23, 123 and the second insulating panels 24, 124 are mutually superimposed in the common direction of their thicknesses.

As shown in FIG. 1, a supplementary layer 25 may be intercalated between the first insulating panels 23, 123 and the second insulating panels 24, 124 and more precisely between the outer surfaces 29 of the first insulating panels 23, 123 and the inner surfaces 38 of the second insulating panels 24, 124. The supplementary layer 25 may act as a seal and/or to reflect infrared radiation. The supplementary layer 25 may, for example, comprise aluminum. The thickness of the supplementary layer 25 is several orders of magnitude less than the thickness of the insulating panels 23, 123, 24, 124, for example of the order of 20 to 50 μm, particularly in the case of aluminum. The supplementary layer 25 is easily perforated, notably by the application of manual force during screwing. Alternatively, the supplementary layer 25 may be disposed against the inner surface 28 of the first insulating panels 23, 123 or against the outer surface 39 of the second insulating panels 24, 124, or a plurality of supplementary layers 25 may be disposed at several of the above-mentioned locations.

The fixing of the second insulating panels 24, 124 to the first insulating panels 23, 123 is provided by fixing screws 1. The fixing screw 1 is arranged at a spacing from the profile 21, 121. The screw 1 may project into the envelope formed by the core 22, the upper wing 31, the lower wing 32, the upper flange 34, the lower flange 35 and a plane connecting the upper flange 34 to the lower flange 35 without being in contact with the profile 21, 121 that accommodates the first insulating panel 23, 123. The total length of the shank of the fixing screw 1 is selected so as to pass entirely through the thickness of the second insulating panels 24, 124 and partly pass through the first insulating panels 23, 123. The density of the first insulating panels 23, 123 and the second insulating panels 24, 124 allows the fixing screw 1 to be tightened by hand. In the presence of a supplementary layer 25, the small thickness of the latter allows screwing. The first insulating panels 23, 123 are fixed to the profiles 21, 121 which are themselves fixed to the fixed support 20. The second insulating panels 24, 124 are fixed to the first insulating panels 23, 123. The screw 1 is arranged substantially in the direction of the thicknesses of the insulating panels 23, 123, 24, 124. The screw 1 passes through the thickness of the second insulating panel 24, 124. The thread of the screw 1 is arranged at least partially engaging in the first insulating panel 23, 123. The head of the screw 1 is in contact with the outer surface 39 of the second panel 24, 124.

The position of the fixing screws 1 through the first insulating panels 23, 123 and the second insulating panels 24, 124 is spaced from the profiles 21, 121 and from the support 20, in the direction of thickness of the assembly. The fixing screws 1 are arranged at a vertical spacing from the connecting regions of the first insulating panels 23, 123 and at a spacing from the upper and lower wings 31, 32 of the profiles 21, 121. The fixing screw 1 is arranged horizontally in the direction of thickness at a spacing from the upper and lower flanges 34 and 35. These offsets reduce the conduction of heat by the fixing screws 1 and by the profiles 21, 121 through the insulating layers. The composition of said fixing screws 1 provides low heat conduction. The composition of synthetic material may comprise plastic and/or composite materials, such as, for example, polypropylene.

Figure 2:
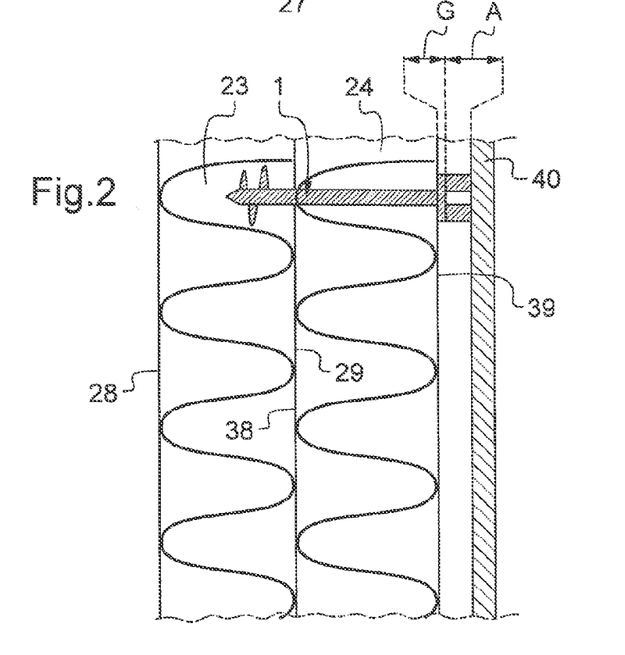
FIG. 2 is a sectional view through an assembly of insulating panels of the ventilated type.

After the fixing screws 1 have been tightened, and as shown in FIG. 2, the second insulating layer may be completed with a supplementary wall 40. The wall 40 may be for example solid, fire-proofed, anti-fire, and/or essentially decorative by nature. The supplementary wall 40 is in contact with the axial ends of the wings 6 of the screw 1. The wings 6 of height A ensure a substantial spacing between the outer surface 39 of the second insulating panel 24 and the supplementary wall 40. This spacing forms a layer of air. The layer of air may have a thickness of at least 10 mm. The presence of a layer of air, like e.g. with a ventilation gap reduces the condensation within the assembly.

The assembly may be obtained by adding a new insulating layer, in this case the second insulating panels 24, to an existing insulating layer, in this case the first insulating panels 23. This results in an improvement in the general insulation of a building without dismantling the pre-existing insulation of this building. In other words, the new insulating layer is fixed, with or without a supplementary layer 25, to the existing insulating layer. The fixing screw 1 is provided to be compatible with insulating panels 23, 24 of various compositions, notably with heterogeneous and/or different bulk densities, ranging for example from 10 to 300 kg/m3. The second insulating panels 24 may be substantially identical in composition to the first insulating panels 23 or may be of substantially different composition. The second insulating panels 24 may be supported, for example free from any other mass. Thus, in the presence of a heavy supplementary wall 40, the latter may be fixed to the rest of the assembly without transmitting the load of its weight to the second insulating panels 24. A heavy supplementary wall 40 may be fixed to the profiles 21 via fixing means that pass locally through the second panels 24 without being supported thereon. In this case, the profiles 21 are load-bearing and the second panels 24 are supported.

Using the fixing screws 1 and the assembly system the heat and sound insulation of buildings can be improved substantially in an inexpensive manner. There is no need to redesign existing components such as the profiles or the insulating panels. In particular, existing plant and machinery for manufacturing metal profiles and insulating panels, for example, are still used. The addition of a supplementary insulating layer preserves the old insulating layer. The addition of the supplementary insulating layer is quick and inexpensive. The speed and ease of fixing of the new insulating layer has advantages both for the manufacturers of the various components of the assembly and for the operators putting these elements together.

Figure 3:
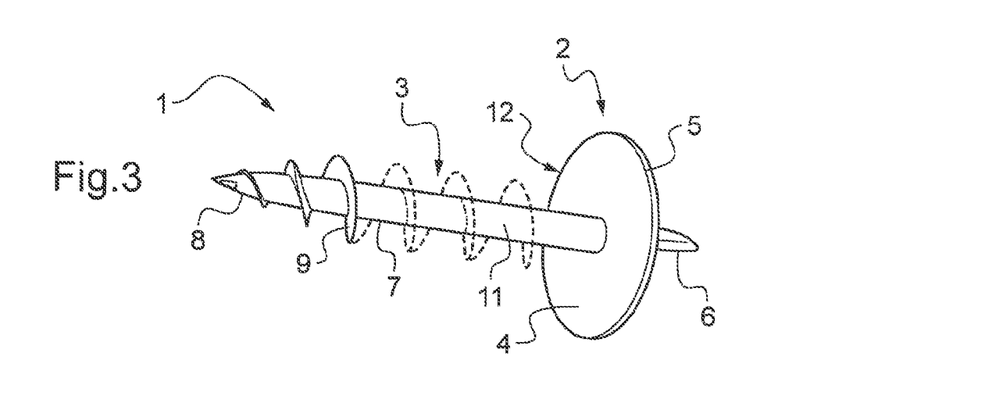
FIG. 3 is a diagrammatic perspective view of a fixing screw.

A fixing screw 1 for insulating panels is shown in FIG. 3. The fixing screw 1 has a head 2 and a shank 3. The head 2 comprises a circular plate 12. The circular plate 12 includes a flat abutment surface 4, also referred to as the "flat underhead" and a surface 5 opposite the abutment surface 4. The flat abutment surface 4 is intended to bear on an insulating panel. The flat abutment surface 4 is axially oriented towards the shank 3. The opposite surface 5 supports a drive wing 6. The drive wing 6 extends substantially perpendicularly to the abutment surface 4 and in an axial direction opposite the shank 3. The drive wing 6 is intended to act as an abutment surface, for example, for at least two fingers of an operator applying a screw torque to the fixing screw 1. The fixing screw 1 may therefore be tightened manually. The screw 1 is made in one piece, for example by moulding a synthetic material, for example of the plastic and/or composite type, such as polypropylene.

The shank 3 extends substantially perpendicularly to the circular plate 12 starting from its centre and in the opposite direction to the wing 6. The shank 3 comprises an elongate body 7 extending axially from the head 2 to a point 8. The point 8 is located at the end of the body 7 opposite from the head 2. In the embodiment described here, the body 7 is substantially cylindrical. Alternatively, the body 7 may be substantially frustum-shaped. The point 8 is a pointed nose cone. The point 8 has recesses, the edges of which form leading edges to assist with simultaneously tightening and penetrating. The body 7 of the shank 3 comprises grooves 11, in this instance. Alternatively, the body 7 may have an outer surface substantially in the form of a body of rotation.

The fixing screw 1 comprises at least one helical thread 9. The helical thread 9 is supported by the shank 3. The helical thread 9 may be supported by the body 7 or the point 8 or by the body 7 and the point 8, cf. FIG. 3. The helical thread 9 is axially spaced from the head 2.

Figure 4:
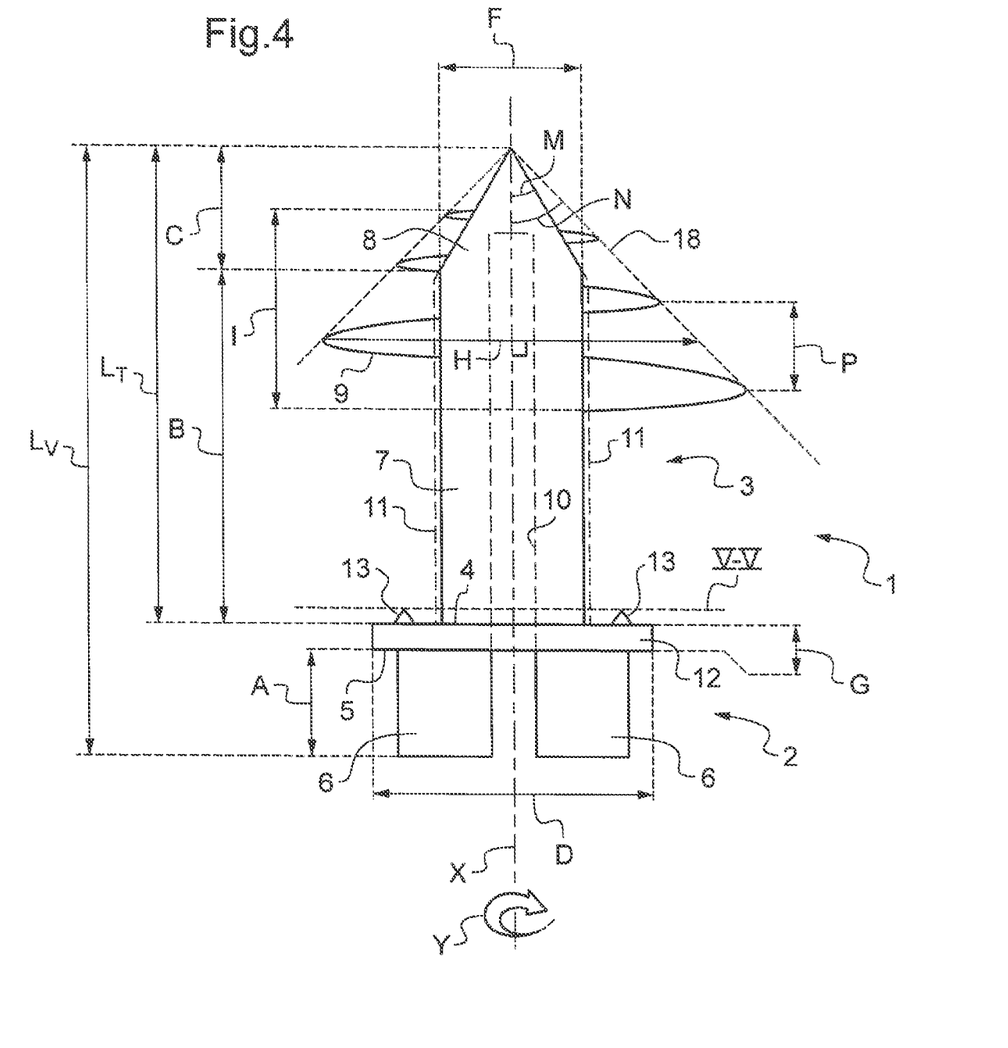
FIG. 4 is a diagrammatic view, in longitudinal section, of a fixing screw.

FIG. 4 shows a fixing screw 1 according to another embodiment, in side view. A main axis X is shown here in dashed lines. Unless stated to the contrary, the term "axis" denotes this main axis X. The arrow marked Y denotes the direction of tightening of the fixing screw 1. This direction of tightening Y corresponds here to clockwise rotation, which corresponds to the direction of tightening conventionally used.

In the embodiment described here the circular plate 12 supports, on its opposite surface 5, two wings 6 extending in the radial direction on either side of the axis X. The two wings 6 extend axially to a distance A starting from the opposite surface 5. The circular plate 12 has a diameter D of 50 to 80 mm and a thickness G of 1 to 3 mm.

The elongate body 7 of the shank 3 has an axial length B extending from the flat abutment surface 4 to the point 8. The elongate body 7 of the shank 3 has a diameter F, which in this instance is substantially constant along the axial direction. The height of the grooves 11 is not taken into account here when determining the diameter F of the body 7, which is between 6 and 10 mm.

The point 8 of the shank 3 has an axial length C. The sum of the axial length B of the body 7 and the axial length C of the point 8 corresponds to the length LT of the shank 3. The sum of the length LT of the shank 3, the thickness G of the circular plate 12 and the distance A between the opposite surface 5 and the axial end of the wings 6 define the total length LV of the screw 1. The point 8 in this case is substantially frustum-shaped and has a half-angle M at the apex, cf. FIG. 4.

The helical thread 9 is inscribed in an envelope 18 shown by dashed lines. In the embodiment described here, the envelope 18 is substantially frustum-shaped. In one embodiment, a portion of the envelope 18, located alongside the head 2, may be substantially cylindrical, as indicated by dashed lines in FIG. 3. In other words, the edges of the helical thread 9, viewed in section as in FIG. 4, are aligned for each side of the axis X. In the embodiment shown here, the envelope 18 and the point 8 share a common apex. The half-angle at the apex of the envelope 18 is designated N. Alternatively, the apices of the point 8 and envelope 18 are distinct. In another variant, the envelope 19 comprises a substantially cylindrical portion.

The diameter H of the helical thread 9 is defined as the diameter of the envelope 18 for a given axial position. In other words, the envelope 18, in a plane substantially perpendicular to the axis X, defines a circle of diameter H. In the case shown here, with a frustum-shaped envelope 18, the diameter H of the thread 9 varies linearly as a function of the axial position on the axis X. The diameter H increases towards the head 2. In the case of a portion with a substantially cylindrical envelope 18, the diameter H is substantially constant. The helical thread 9 extends axially over a length designated I. The pitch of the helical thread 9 is designated P. The pitch P is more than 8 mm and preferably more than 15 mm or even 25 mm.

As shown by dashed lines in FIG. 4 and as may be seen from FIGS. 7 to 12, the fixing screw 1 comprises a hollow indentation 10 for rotational driving. The hollow indentation 10 extends axially from the opposite surface 5 to a portion of the body 7 supporting the thread 9. The indentation 10 is of non-circular section, for example hexagonal, to allow the fixing screw 1 to be rotationally driven by a suitable screwing tool. In the case of a variant comprising recesses in the point 8, as described in FIG. 3, the hollow indentation 10 may open into the recesses. When a screwing indentation 10 is provided, the wing or wings 6 are arranged to leave a passage for the said screwing tool. The body 3 comprises a hollow portion.

In an embodiment shown in FIG. 4, the screw 1 comprises two wings 6 extending in a radial direction on either side of the axis X of the shank 7. The wings 6 extend axially starting from the opposite surface 5. The wings 6 are substantially coplanar. In an alternative embodiment shown in FIGS. 7 to 10, the wings 6 may be curved about axes parallel to the axis X. Two wings 6, shown in section in a plane perpendicular to the axis X, then take the form of a flattened S. The curved shape of the wings 6 may allow better, more ergonomic matching to the shape of the fingers of the operator, for manual tightening. Each wing 6 is of the order of 1 to 3 mm thick. The remainder of the opposite surface 5 is substantially flat. The space left free around the wings 6, beyond the opposite surface 5 along the main axis X, forms recessed zones 41 corresponding to the wings 6. The recessed zones 41 provide room for screwing tools and/or the operator's fingers.

Figure 11:
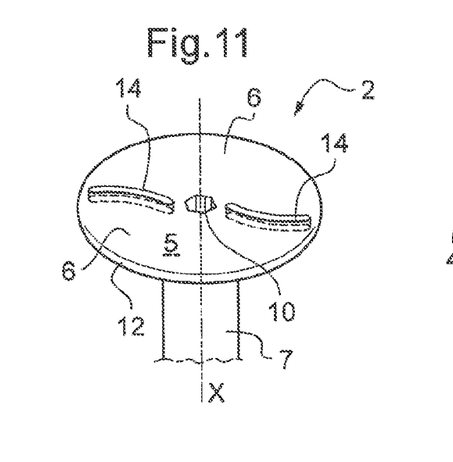
FIG. 11 is a perspective view of a screw head.
Figure 12:
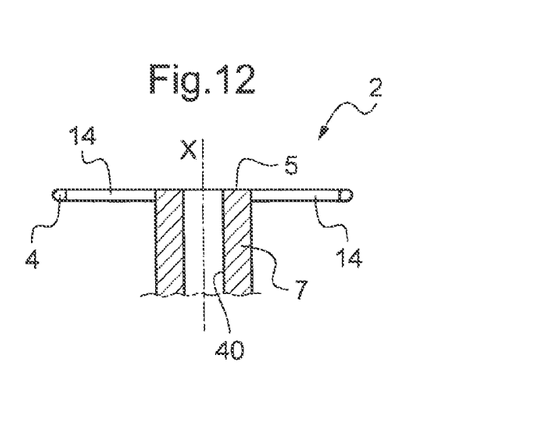
FIG. 12 is an axial section through a screw head different from the one in FIG. 11.

In two other embodiments, shown in FIGS. 11 and 12, the wings 6 take up most of the angular zone of the head 2 along the main axis X, for example of the order of 175° each. The remainder of the angular zone of the head 2 comprises recesses 14 in the circular plate 12. In other words, the circular plate 12 comprises recesses 14, while the material of the circular plate 12 forming the periphery of said recesses 14 constitutes the wings 6. The bore of the recesses 14 serves as a support surface for the screwing. The recesses 14 open into the opposite surface 5. The recesses 14 provide room for the insertion of a point of a screwing tool or fingers for pressing on the bore of the recesses 14, i.e. the wings 6, and for applying a screw torque. In this instance the recesses 14 go right through and open into the abutment surface 4. Alternatively, the recesses 14 may be blind and open only onto the opposite surface 5. The shape of the recesses and their opening surface are selected so as to allow tightening to be carried out. In the embodiment described here, the recesses 14 are of a curved elongate shape similar to the shape of the wings 6 in FIG. 7. The presence of recesses 14 allows a saving of material during the production of the screw 1. In an alternative feature, the recesses 14 may take up a large angular space, for example of the order of 350° in total, while the wings 6 take up a space of the order of 10° in total. The head 2 is then in the form of a ring connected to the shank 3 by wings 6 arranged substantially along the radii of the circular plate 12.

The embodiment in FIG. 11 comprises a substantially hexagonal screwing indentation 10. The embodiment in FIG. 12 comprises a shank 3 including a hollow portion formed by a substantially cylindrical recess 40. The cylindrical hollow portion 40 may or may not be extended by a screwing indentation 10.

The abutment surface 4 of the head 2 is provided with bosses 13 so as to inhibit any slackening of the screw. The bosses 13 in this instance are in the form of points or cones projecting from the abutment surface 4. The bosses 13 are distributed around the circumference of the abutment surface 4 at a spacing from the shank 7.

Figure 5:
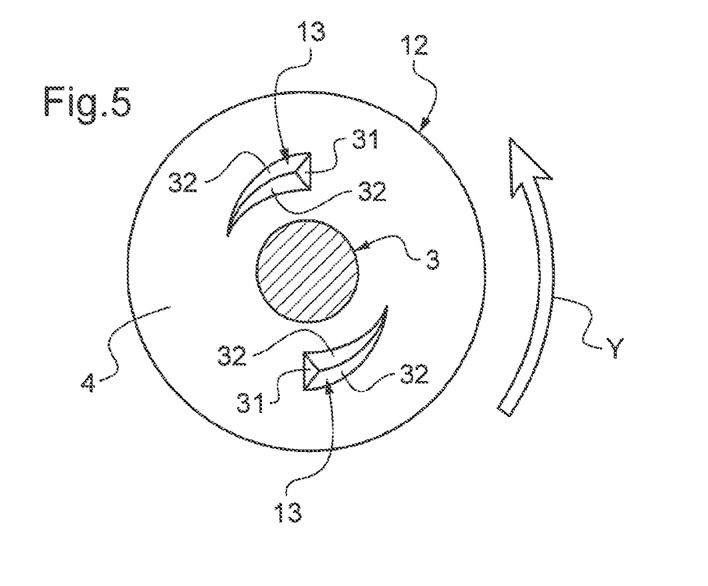
FIG. 5 is a radial section through a fixing screw on the line V-V.
Figure 6:
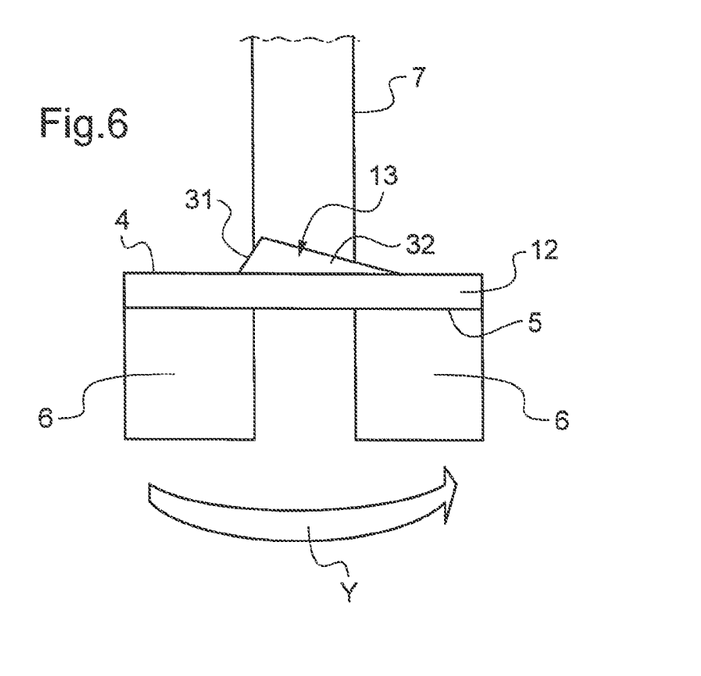
FIG. 6 is a detailed side view of the screw in FIG. 5.
Figures 7, 8:
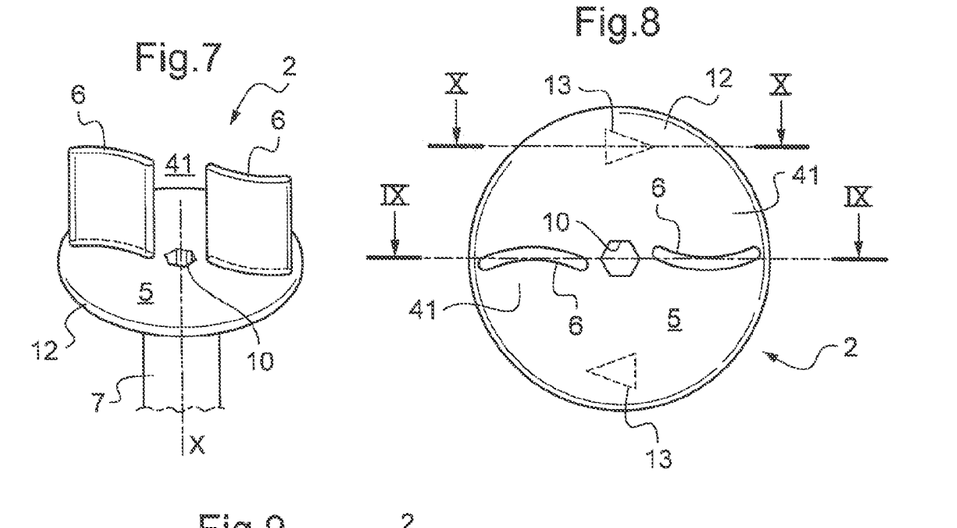
FIG. 7 is a perspective view of a screw head.
FIG. 8 is a plan view of FIG. 7.
Figure 9:
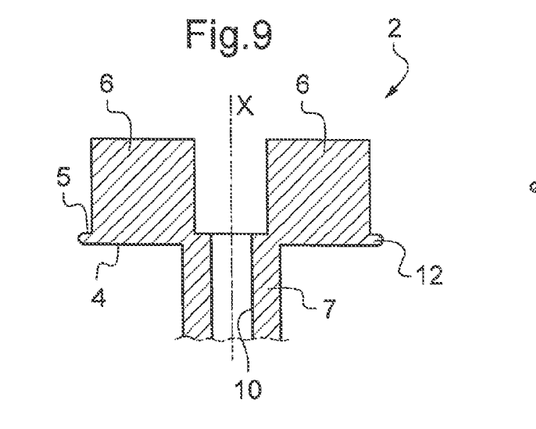
FIG. 9 is a section along the axis IX-IX in FIG. 8.
Figure 10:
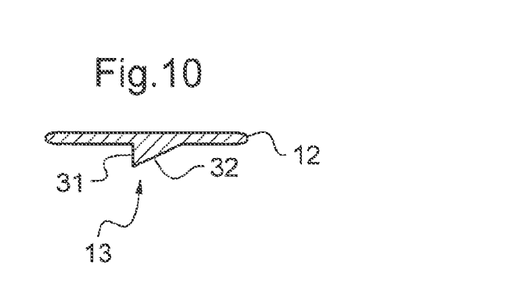
FIG. 10 is a section along the axis X-X in FIG. 8.

In an alternative embodiment shown in FIGS. 5 and 6, the bosses 13 are asymmetrical with respect to a plane passing through the axis X. The bosses 13 may have different gradients in the direction of tightening Y and in the opposite direction of unscrewing. In this way, the bosses 13 comprise a surface 31 for braking slackening which has a substantial gradient in relation to the abutment surface 4. During the tightening, the bosses 13 have penetrating surfaces 32 of small gradient in relation to the abutment surface 4. In other words, the bosses 13 are arranged so as to give the fixing screw 1 a coefficient of friction which is greater in a direction of unscrewing than in a direction of tightening Y. The bosses 13 slow down the unscrewing.

In an alternative embodiment shown in FIGS. 7 to 10, the braking surface 31 is substantially perpendicular to the abutment surface 4.

In another variant, the screw 1 comprises recesses 14 and bosses 13 mutually aligned along the direction of the main axis X. In this variant, the recesses 14 and the bosses 13 may be formed simultaneously for example by localised repositioning of the material of the circular plate 12 from the opposite surface 5 towards the abutment surface 4.

As the fixing screws 1 have the function of ensuring the attachment to one another of insulating panels of relative low mean bulk density, for example between 10 and 300 kg/m3, subjected to relatively low detachment forces, the developed length of the helical thread 9 may be relatively small compared with fixing screws in the field of the attachment of wood or metal panels, for example. The fixing screw 1 is designed to be able to be hand-tightened, i.e. without any particular screwing tool. Consequently, the final tightening position should be capable of being achieved with a limited number of turns. The Applicant has therefore determined that the pitch P of the helical thread 9 is more than 8 mm, and preferably more than 15 mm. For use in panels of very low bulk density, for example less than 50 kg/m3, the pitch P may be even greater than 25 mm. The Applicant has in fact ascertained by measurement that a screw 1 of this kind used in a system as described hereinbefore withstood a screwing torque of between 0.2 and 2.0 Nm in rock wool with a mean bulk density of 50 kg/m3 or in polyurethane (PUR) or polyisocyanurate (PIR).

The fixing screws 1 have a ratio of length to diameter that is substantially greater than conventional screws. In particular, the body 7 of the shank 3 has a ratio of length B to diameter F of more than 20.

In order to allow screwing that involves substantial translatory movement for little rotation while passing through insulating panels of considerable thickness, the fixing screw 1 comprises a thread 9 extending over a length I of more than 30 mm.

The invention may take the form of a kit for mounting a second insulating panel on a first insulating panel comprising at least one second insulating panel and at least one fixing screw.

The invention may take the form of a process for fixing a second insulating panel on a first insulating panel. This process comprises tightening the screw manually or using a tool adapted to a hollow screwing indentation in the screw. The screw is then self-tapping through the second insulating panel until it passes right through the thickness of the second insulating panel. In a second screwing phase the thread of the screw emerges through the inner surface of the second insulating panel and engages in the first insulating panel by entering the first insulating panel by its outer surface. At the end of screwing, the abutment surface of the screw head bears on the outer surface of the second insulating panel.

The invention is not limited to the embodiments of process and apparatus described hereinbefore, purely by way of example, but encompasses all the variants that may be envisaged by the skilled man within the scope of the claims that follow.

The invention claimed is:

1. A screw device for fixing insulating panels together, comprising:
   a fixing screw (1) being made in one piece from a synthetic material and comprising a head (2) and a shank (3),
   the head (2) comprised of a circular plate (12) providing
   i) a flat abutment surface (4) for abutment on one of said insulating panels, the abutment surface (4) being circular and extending to an outer edge of the circular plate (12), and
   ii) a surface (5) opposite the abutment surface (4), provided with at least one drive wing (6), said wing (6) extending to a selected distance (A) from the opposite surface (5), said distance (A) being more than 10 mm,
   the shank (3) comprising
   i) an elongate body (7) extending from the abutment surface (4) of the head (2) and substantially perpendicular to the abutment surface (4),
   ii) a point (8) arranged at an end of the body (7) opposite the head (2), and
   iii) at least one helical thread (9),
   the at least one helical thread (9) extending at least over a part of at least one of the group consisting of i) the point (8) and ii) the body (7),
   the at least one helical thread (9) being spaced from the head (2), the at least one helical thread (9) having a diameter (H) that increases towards the head (2),
   the at least one helical thread (9) comprising a portion having a frustum-shaped envelope (18),
   the pitch (P) of the at least one helical thread (9) being greater than 8 mm.

2. The screw device according to claim 1, further comprising a hollow indentation (10) for driving in rotation.

3. The screw device according to claim 2, wherein the hollow indentation (10) extends axially up to a portion of the body (7) supporting the thread (9).

4. The screw device according to claim 1, wherein the body (7) of the shank (3) comprises grooves (11).

5. The screw device according to claim 1, wherein a ratio of length (B) to diameter (F) of the body (7) of the shank (3) is more than 20.

6. The screw device according to claim 1, wherein the pitch (P) of the at least one helical thread (9) is greater than 15 mm.

7. The screw device according to claim 1, wherein the abutment surface (4) of the head (2) is provided with bosses (13) to slow down unscrewing, the bosses (13) being asymmetrical with respect to a sectional plane passing through an axis (X) of the shank (3) so as to confer a coefficient of friction that is greater in a direction of unscrewing than in a direction of tightening (Y).

8. The screw device according to claim 1, comprising two wings (6) extending in the radial direction on either side of an axis (X) of the shank (3) and extending axially to said selected distance (A) from the opposite surface (5).

9. The screw device according to claim 1, wherein the body (7) comprises a hollow portion.

10. A process for fixing a second insulating panel (24) to a first insulating panel (23), comprising screwing a fixing screw according to claim 1 through the thickness of a second insulating panel (24) and engaging the at least one helical thread (9) of the screw (1) in a first insulating panel (23).

11. The screw device according to claim 1, wherein the pitch (P) of the at least one helical thread (9) is 25 mm.

12. The screw device according to claim 1, wherein the at least one helical thread (9) extends at least over i) a part of the point (8) or ii) a part of the body.

13. The screw device according to claim 1, wherein the at least one helical thread (9) extending at least over both a part of the point (8) and a part of the body (7).

14. The screw device according to claim 1, further comprising a hollow indentation (10), the wherein the hollow indentation (10) extends axially from the opposite surface (5) up to a portion of the body (7) supporting the at least one helical thread (9), and
   wherein there are two of said at least one drive wing (6), each of the two drive wings (6) being located on opposite sides of the hollow indentation (10), the two drive wings (6) having a supplementary abutment surface for at least two fingers of an operator applying a screw torque for driving the screw into the insulating panels.

15. The screw device according to claim 1, wherein there are two of said at least one drive wing (6), each of the two drive wings (6) being located on opposite sides of the hollow indentation (10), the two drive wings (6) each having a supplementary abutment surface for at least two fingers of an operator applying a screw torque for driving and fixing, by hand, the screw into the insulating panels, the two drive wings providing a ventilation air gap between an outer surface of the fixed insulating panels and an additional wall or cladding fixed opposite the outer surface.

16. A system for insulating a building wall, comprising at least one first insulating panel (23) and at least one second insulating panel (24) of bulk density between 10 and 300 kg/m$^3$, mutually superimposed in the common direction of thicknesses and joined together by at least one screw (1) according to claim 1, the screw (1) being arranged substantially in the direction of thickness of the insulating panels, a portion of the shank (3) passing through the thickness of the second panel (24), so that the thread (9) being engaged in the first insulating panel (23) and the abutment surface (4) being in contact with an outer surface (39) of the second panel (24).

17. The system according to claim 16, further comprising a supplementary wall (40) bearing on at least one wing (6) of the screw (1) so that a layer of air with a non-zero thickness (A) is formed between the supplementary wall (40) and the outer surface (39) of the second panel (24).

18. The system according to claim 17, wherein the first insulating panel (23) is mounted in a profile (21) and held in the profile (21) by a flange (34) of the profile (21), the second insulating panel (24) being fixed to the first insulating panel (23) by the screw (1) arranged at a spacing from the profile (21).

19. The system according to claim 16, wherein the first insulating panel (23) is mounted in a profile (21) and held in the profile (21) by a flange (34) of the profile (21), the second insulating panel (24) being fixed to the first insulating panel (23) by the screw (1) arranged at a spacing from the profile (21).

20. A kit for mounting a second insulating panel (24) on a first insulating panel (23), comprising at least one second insulating panel (24) of a mean bulk density of between 10 and 300 kg/m$^3$ each and a fixing screw (1) according to claim 1, the second insulating panel (24) being intended to be fixed to a first insulating panel (23) so that the first insulating panel (23) and the second insulating panel (24) are mutually superimposed in the common direction of thicknesses and joined together by the screw (1), the screw (1) being intended to be screwed substantially in the direction of thickness of the insulating panels, a portion of the shank (3) passing through the thickness of the second panel (24), so that the thread (9) is engaged in the first insulating panel (23) and the abutment surface (4) is in contact with an outer surface (39) of the second panel (24).

\* \* \* \* \*